(12) United States Patent
Nicolas

(10) Patent No.: US 9,021,604 B2
(45) Date of Patent: Apr. 28, 2015

(54) METHOD TO CONTROL THE ACCESS OF PERSONAL DATA OF A USER

(75) Inventor: Christophe Nicolas, Saint-Prex (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/342,709

(22) PCT Filed: Aug. 30, 2012

(86) PCT No.: PCT/EP2012/066837
§ 371 (c)(1),
(2), (4) Date: Mar. 4, 2014

(87) PCT Pub. No.: WO2013/030260
PCT Pub. Date: Mar. 7, 2013

(65) Prior Publication Data
US 2014/0215638 A1    Jul. 31, 2014

Related U.S. Application Data

(60) Provisional application No. 61/530,416, filed on Sep. 2, 2011.

(30) Foreign Application Priority Data

Nov. 29, 2011   (EP) .................................. 11191213

(51) Int. Cl.
*H04L 29/06*     (2006.01)
*G06F 21/00*     (2013.01)
(Continued)

(52) U.S. Cl.
CPC .......... *G06F 21/6245* (2013.01); *H04L 63/102* (2013.01); *G06F 21/6254* (2013.01);
(Continued)

(58) Field of Classification Search
CPC ... H04L 63/102; H04L 63/10; G06F 21/6245; G06F 21/6254; G06F 21/6272; G06F 2221/2141; G06F 2221/2105; G06F 2221/2115; G06F 2221/2117; G06F 2221/2149; G06Q 30/02
USPC .............................................. 726/27; 709/224
See application file for complete search history.

(56) References Cited

U.S. PATENT DOCUMENTS 7,308,413 B1 * 12/2007 Tota et al. .................... 705/7.11
7,607,164 B2 * 10/2009 Vasishth et al. .................. 726/1
(Continued)

OTHER PUBLICATIONS

International Search Report issued in International Application No. PCT/EP2012/066837 dated Nov. 26, 2012.
(Continued)

*Primary Examiner* — Haresh N Patel
(74) *Attorney, Agent, or Firm* — DLA Piper LLP US

(57) ABSTRACT

A system and method give a user control of personal data. A trusted center comprises a database for personal data, access conditions for the personal data, and a counter. A user loads personal data into the database and assigns access conditions to said data. The personal data is divided into at least two categories, each associated with a user's value. A third party requests access to personal data of a plurality of users, the request comprising search criteria. The trusted center identifies a first set of users matching the search criteria and returns the quantity of users in, and a sum of user's values for, the first set. The third party acknowledges all or part of the sum, and the trusted center returns the personal data of a second set of users for which the sum covers the user's values and updates the counters of user in the second set.

9 Claims, 1 Drawing Sheet

(51) Int. Cl.
*G06F 21/62* (2013.01)
*G06Q 30/02* (2012.01)

(52) U.S. Cl.
CPC ........ *G06Q30/02* (2013.01); *G06F 2221/2105* (2013.01); *G06F 2221/2115* (2013.01); *G06F 2221/2117* (2013.01); *G06F 2221/2149* (2013.01); *G06F 2221/2141* (2013.01); *G06F 21/6272* (2013.01); *H04L 63/10* (2013.01)

(56) References Cited

U.S. PATENT DOCUMENTS

| | | | |
|---|---|---|---|
| 7,792,702 B1 * | 9/2010 | Katz et al. | 705/26.1 |
| 7,818,219 B2 * | 10/2010 | Klivington et al. | 705/26.1 |
| 7,925,592 B1 | 4/2011 | Issa et al. | |
| 7,962,603 B1 * | 6/2011 | Morimoto | 709/224 |
| 2003/0149654 A1 * | 8/2003 | Harrington et al. | 705/37 |
| 2006/0155695 A1 * | 7/2006 | Pyka | 707/4 |
| 2006/0195428 A1 * | 8/2006 | Peckover | 707/3 |
| 2009/0119280 A1 * | 5/2009 | Waters et al. | 707/5 |
| 2010/0088364 A1 | 4/2010 | Carter et al. | |
| 2012/0310845 A1 * | 12/2012 | Carter | 705/306 |
| 2013/0073473 A1 * | 3/2013 | Heath | 705/319 |
| 2014/0006260 A1 * | 1/2014 | Pilcher | 705/39 |

OTHER PUBLICATIONS

Written Opinion Report issued in International Application No. PCT/EP2012/066837 dated Nov. 26, 2012.

* cited by examiner

METHOD TO CONTROL THE ACCESS OF PERSONAL DATA OF A USER

CROSS-REFERENCE TO RELATED APPLICATIONS

This application is a National Stage of International Application No PCT/EP2012/066837, which claims priority to European patent Application No. EP 11191213.5, filed Nov. 29, 2011 and to U.S. Provisional patent Application No. 61/530,416, filed Sep. 2, 2011.

INTRODUCTION

With the development of communication networks, users of these networks are increasingly solicited to give away personal data to service providers to feed such personal data into data bases.

As the computerized environment increases in importance and performance, the average user is more and more frustrated by bad-quality computer engines that care too little about his privacy needs.

BACKGROUND ART

Some third parties put a high value on the personal data that an individual puts on various connected systems that are part of his everyday life. The use that such third parties can make goes from market studies to targeted advertising to data mining and the like.

So far, there has been no framework or structure to:
1) enable the user to keep full control of his personal data;
2) convince the user that he takes no disproportionate risk in giving away such data;
3) as a further possible step, formally monetize the personal data posted, thanks to the trust of the user, as direct benefit to said user.

The quality of data bases can be adversely affected by distrust of individuals. In the case of a census for instance, some free-thinking users adopt anti-establishment behaviors by providing false data, just because they do not trust the governmental entity that is requesting them to provide these data.

When the data provided is clearly out-of-range, cleaning the results flow is relatively easy and can be done in an automated way, for example by simple cross-checks between responses provided by a single user. However, when the free-thinker is more sophisticated and knows how to outfox the automated checks, there is very little that can be done to obtain true data and a resulting good quality of aggregated data bases.

There is therefore a need for a system that is designed to give full and continued control of his data by a user, gain the trust of the average individual, encouraging such individual to become an open-minded and trustful user of such system.

The problem has become more acute with the increased popularity, especially among young adults, of social networks. The managers of a number of such social networks tend have little consideration for any future disadvantages of the lack of experience of these young adults vis-à-vis the perception problems that a visitor of such social networks may encounter.

For example, a careless youngster can post on his personal storage, hosted by a social network, some visuals that he, on second thought or years after, would rather restrict access to. Such visuals can be for instance videos or photographs shot during a private party, during which alcohol, or more generally substances able to modify the state of consciousness, were ingested of inhaled.

When said careless youngster becomes a graduate in search of a job, the fact that a social network did grant access, by non-restricted or not enough restricted audiences, to clues of said way of life illustrated by the afore-mentioned visuals can be a disadvantage in finding a desired job.

If said youngster embraces a political career, the backlash can be even more severe, with evidence of a past life as a young man or woman being displayed by the press to a large public, especially a senior or elderly public with little inclination to forgiveness, thus undermining the credibility of the person in question, even though that person may have grown up and regrets his past behavior as a youngster. The continued storing, in out-of-reach databases, of extracts of postings made by youngsters can thus become very detrimental to their professional or political future.

The problem is made more serious by the fact that the managers of social networks sometimes have a tendency to over-protect their organization, should they become aware of data ownership issues, by altering the legal terms applying to the individual members of a given social network.

In such a case, a lack of consideration for the interests of such individual members can result in severe damage to said interests. For instance, legal conditions are sometimes modified without notice, claiming ownership by the network of any and all data posted on the individual's personal storage.

Even if the information on such a change in legal terms is communicated to subscribers, there is a high probability that a vast majority of the younger users will not react and therefore implicitly accept such change. And even if some react and demand a deletion of the incriminated data, they face the perspective of a costly legal action against said social network, with uncertain success. The cost to an individual of such legal action, as compared to the often disproportionate resources available to the social network as a defendant, can deter the individual from starting such action at all, entailing a sense of frustration on his part.

The number of cases where the credibility, or personal life, or professional future an individual was undermined, or deteriorated, or compromised is on the rise, and so is the press coverage of such stories, as well as the resulting awareness of the public.

With the surge in this number of cases, a consequence of the afore-mentioned facts is an increased defiance vis-à-vis social networks in the public at large. However, the social networks are trendy and gaining momentum among the younger public. This makes them unavoidable to a large extent to ambitious personalities, who do not always realize the danger they represent for their future social life.

BRIEF DESCRIPTION OF THE INVENTION

It is proposed a method to control the access of personal data of a user by a trusted centre comprising at least one database comprising for a specific user, memory locations for personal data, access conditions associated to the personal data and management data comprising at least a counter, loading by a user into the database of the trusted center, its personal data and assigning access conditions to said data, said personal data being divided into at least two categories having two different access conditions, each category being associated with a user's value, requesting access to the trusted center by a third party to the personal data of a plurality of users, said request comprising search criteria, executing by the trusted center the search criteria on the personal data of the users so as to determine a first set of users matching the search criteria, returning to the third party information showing the quantity of the first set of users matching the criteria, as well as the sum of the user's value of each user of the first set, acknowledging all of part of the sum by the third party, thus defining a second set of users that can comprise all or part of the first set, returning the personal data of the second set of user for which the sum covers the accumulated values of the extracted users, updating the counter of the second set of users with the content of the value of their respective personal data.

BRIEF DESCRIPTION OF THE DRAWING

The present invention will be better understood thanks to the attached figures in which:

the FIG. 1 shows a system with the trusted center connected to Internet the FIG. 2 shows a system in which the trusted center plays the role of a proxy.

DETAILED DESCRIPTION

Figure 1:
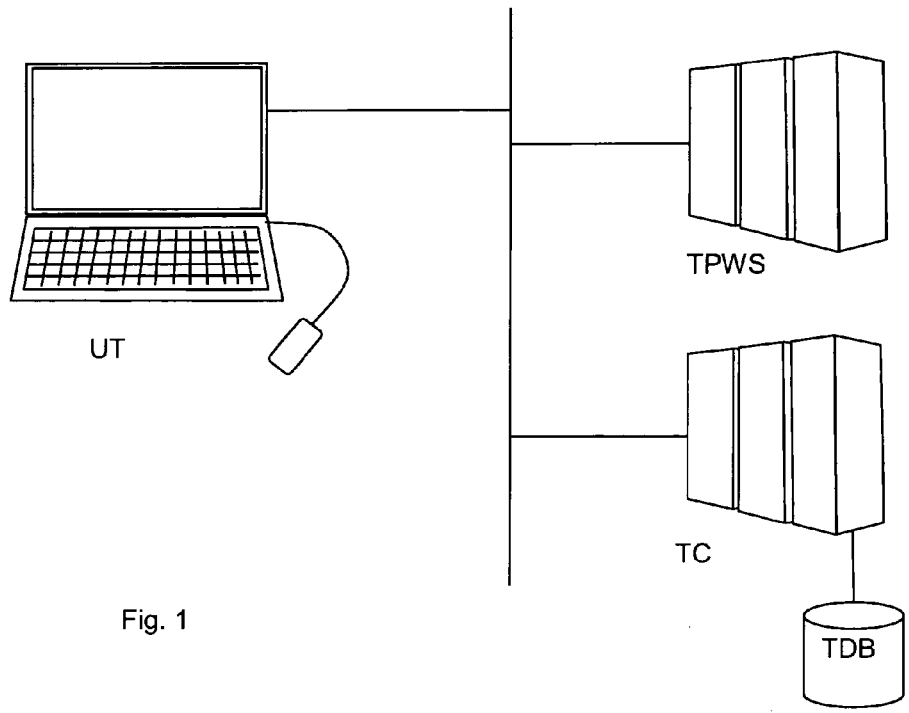

The invention consists in a subscription system to a trusted center TC open to at least one part of the general public, in which a subscribing member is encouraged, by defined system features, to keep full control of his personal data once they are fed onto the system. The subscribing member is therefore encouraged to provide true data to the trusted center.

Such defined trusted center TC features can consist in minimal standards of quality in processing said provided data. For instance, existing systems are able to track down the fact that an internet user has browsed sites of hotels in Italy, and immediately propose discounted-price travel offers to Italy to that user. Such offers can be perceived as intrusive and unwanted advertising. A minimum standard of quality can consist in defining, with each individual user, to what extent such automated offers can be generated and displayed.

Another defined system feature can also consist in providing the possibility to genuinely and reliably erase a history of data for the individual user.

In a particular embodiment of the invention, a system feature is designed to provide full transparency to a subscribing user.

In a particular embodiment of the invention, the system provides a differentiated level of control to a subscribing user, onto the type of data he feeds the system with.

As a first example, a first category of level of control is allocated to the user's preferences in sports. Such preference data can consist in his personal ratings in sports. For example, a user A can let the system know that he prefers basketball to football, football to tennis, and tennis to windsurfing. Such preference data can also consist in personal ratings on various competing teams in a given sport. As another example, a user B may disclose, with a certain level of ownership and control, the information that he prefers a certain basketball team to another given basketball team.

As a second example, a second category or level of control is allocated to the user's hobbies.

As a third example, a second level of control is allocated to the user's political orientation. Data on political orientation may therefore be considered, by the user, as more sensitive than sports preferences or hobbies, and be granted a more restrictive level of protection against external, non-user access.

As a fourth example, a third level of control is allocated to the user's sexual preferences, orientation or habits.

As an additional example, a level of control is allocated to the user's investor's profile characteristics. Such characteristics can be financial conservativeness, risk-tolerance, inclination to alternate-scheme investments, fair-trade or nature conservation preferences in investment choices, or the like.

In a particular embodiment of the invention, the system provides a differentiated level of control on the different types of data as afore-mentioned.

This control can be exercised by different ways:
a) directly through explicit choices,
b) indirectly, for instance by defining access rules,
c) by proxy, i.e. by subcontracting a level of control to a trusted third party.

For each category, the user can define a user's value that represents the value of this information for said category. Different manner to fill this value can be applied.

The user can freely define the value

The system proposes predefined values, and the user selects one

The value is automatically added by the system and simply acknowledged by the user.

It is worth noting that the user can decide not to share a particular category of its personal data.

In fact, when a category matches the search criteria of the third party, it is not the category that is sent back to the third party but the user identification. For a given category, e.g. sport, the user can also decide which part of its identification is sent. He can select an e-mail address, a name, a location, a twitter or facebook account, i.e. information that can be used to allows the third party to propose services or goods to said user.

The method described above can be used in a more abstract level and in an anonymous way. The third party could be only interested to the number of hits for specific search criteria. For example, a company, before opening a sport shop in a specific place, can make a request to the trusted center in order to obtain the number of people which are regular sports participants in a geographic zone close to the future shop. In this case, the trusted center does not send back the identification of the user.

For this case, each category of the personal data can have in fact two user's values, one for having access to the user's identification and another one for simply participating to this anonymous search.

The result of the search can give a large number of hits. This is why the present method proposes some optimization features. In the case that the user's value can have different content, i.e. for one user, 0.1 cents and another user, 0.2 cents, the trusted center will organize the data transmitted to the third party by grouping the users having the same amount. The trusted center presents the information by amount, e.g. 1200 users at 0.1 cents and 2300 users at 0.2 cents (of the users satisfying the search criteria). The third party can then decide to refine the search by adding additional search criteria and rerun the request to the trusted center or can accept the deal proposed for the first set of user.

In the search criteria sent by the third party, the latter can include a limit value. This value will define how many hits will be returned to the third party by the trusted center. This limit value corresponds to the accrued user's value until the limit value is reached.

It is well known that the interest for the personal data is higher if they are accurate. This is why the trusted center can carry out various verifications on the personal data with or without the help of the user. The user can have an interest that his data are validated, thus allowing a higher value for each of the category. The verification will focus on the age, gender, address and other personal data. It is more difficult to verify the preferences such as preferred color, vacation destination etc.

When the user profile is verified by the trusted center the trusted center can increase the user's value. The third party can also include in the search criteria the possibility to access only validated user (and usually pay more) or all user's.

Figure 2:
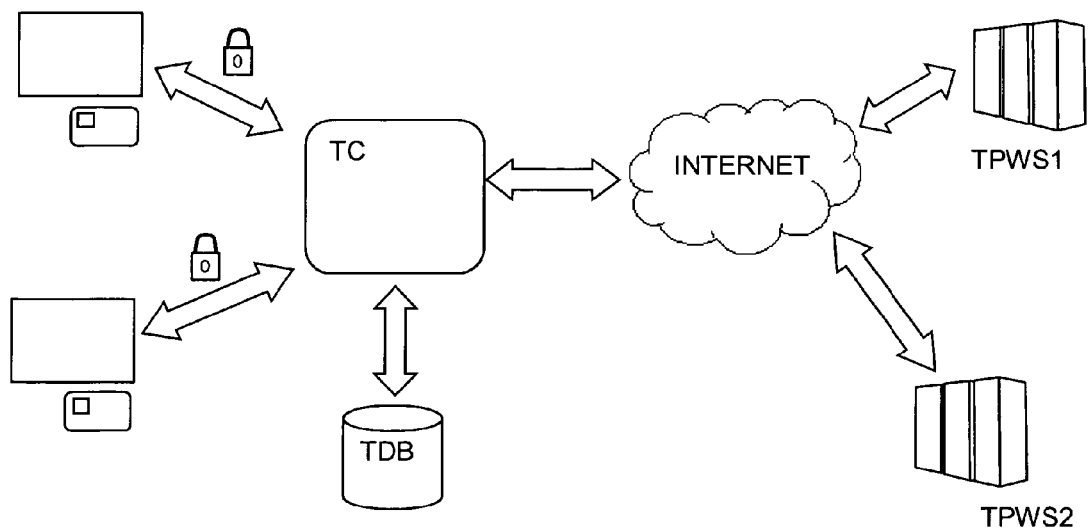

In the FIG. 2, the embodiment illustrates the case where the trusted center TC plays the role of a proxy. The various users UT1, UT2 first connect to the trusted center TC and from this center, have access to the third party websites TPWS1, TPWS2. In this case, the user first connects through the trusted center TC to a third party website TPWS. At that time, the functionality of the TC could be transparent and the identification and authentication of the user will take place at a later stage.

In another embodiment, the proxy authenticates the user prior to accessing the TPWS.

The TPWS then request the identification of the user and this request is passed to the TC. The latter can check if the personal data (all or part) of the user are accessible to this TPWS. In the positive event, the personal data are sent back to the TPWS. Besides that, the user can be identified by a unique identifier for said TPWS, this identifier being the same each time the user connects to the TPWS but unique to said TPWS.

In a particular embodiment of the invention, the system provides a differentiated level of control on the data via different encryption features applied on the data.

According to a first way of implementing the invention, the user, via its user's terminal UT, connects to a trusted center TC and loads its personal data, thanks to a secure communication between the user and the trusted center.

As explained above, the personal data are divided into categories and each category is assigned to particular access right. In the access right, several data can be defined such as the third party allowed accessing these data. This setting can be in the form of a list of third party websites (e.g. Facebook™, Twitter™, LinkedIn™) that the user sticks if the data of this category is accessible to this third party website. The personal data could also be pictures, texts of movies.

Besides that, it is possible to define rules for exploiting the personal data such as defining financial compensation in case the personal data are transferred to a third party. For each category of personal data, a particular amount can be defined.

The third party web service TPWS can also enroll into the trusted database TDB. A profile can be defined as well as a description of the type of activity (e.g. sport activities, information). This third party can define the type of users it is interested to such as young male or person with pets.

This web service can also define the compensation for accessing user's personal data matching the categories of interest by this web service, this compensation could be associated to the entire user's record or split by user's data category.

In a second step, the user accesses a third party website TPWS and is invited to identify himself. In order to obtain the personal data by the third party website, the latter initiates a secure link with the trusted center and transmits the identity of the user as well as an identifier of the third party website.

The trusted center will then authenticate the user through this link and will request the credential of the user. This can be in the form of a password or based on a more secure operation involving a one time password (using a personal card that generates this one time password). Once the user has been authenticated, the trusted center checks the access conditions to the personal data using the identifier of the third party website. In view of this verification, the personal data are (or aren't) returned to the third party website.

The request to the trusted center can also include filter information. The third party website can be interested to only a part of the personal data (by using the descriptor of the data) or can also limit the type of the size of the data. In case that the personal data comprises a movie of 500 Mbytes, the third party website can specify the maximal size of the data requested. Instead or in addition to the size, the third party website can specify the type of data he is interested on, e.g. preferences, pictures etc.

To identify the user, the third party can receive a unique identifier from the trusted center, this identifier identifying the user on one hand but being unique for the third party on the other hand. In this case, the third party receives the personal data of the user currently accessing its services without knowing the true identity of the user.

During the authentication process, the third party can also add some category(ies) of interest and transmit it to the trusted center. The latter can then verify if the user currently authenticated matches the category identified by the third party and in the positive event, the personal data of the user can be transmitted to the third party. In case that a financial compensation was defined by the user, and accepted by the third party, a credit is made on the user's account, credit provided by the third party. The user's counter will then be incremented.

As explained above, the trusted center can play the role of the proxy. The trusted center database contains the personal data and the proxy first identifies the user. Once identified, the trusted center can oversee the communication between the user's terminal and a website. In case that the user as blocked some personal data, such as the telephone number, the trusted center can warn the user in case the telephone number is requested. For the proxy mode, the goal is to catch personal data that would transit from the user to the website. It is hard to block a site that would request personal data but it is easy to block data that we know (i.e. the data given by the user to the trusted center). In this mode the proxy acts as a DLP (Data Loss Prevention) device.

In a lighter version, it is possible to load a small software application into the user's computer to store its user's identification for the trusted center. When the user accesses to a third party web service, having itself an account with the trusted center, the user can authorize to access its personal data to this third party (generally against compensation). This authorization can be in the form of clicking into a logo of the trusted center in the third party webpage. In order to keep the anonymity of the user, the third party transmits to the user's application an identifier (IDTP) of the third party. The user's application stores the user's identifier (IDU), a personal key (KUpr), the private key of an asymmetric key pair, and a trusted center key (KTpu), the public key of the trusted center.

The user's application generates two cryptograms, the first cryptogram $(IDU)_{KTpu}$ in obtained by the encryption of the user's identifier IDU with the trusted center key KTpu and the second cryptogram $(IDTP)_{KUpr}$ is obtained by the encryption of the third party identifier IDTP by the personal key KUpr. It is to be noted that the second cryptogram represents for the third party a unique identifier that allow to check if this user has already visited this third party. In the positive event, the data collected during previous visit, as well as possible personal data of this user can be used to personalize the presentation of the web offer.

In the case that the second cryptogram is new, it means that this user connects to the third party for the first time. The third party can access the trusted center and can transmit the first cryptogram as well as its own identification. The trusted center can decrypt the first cryptogram in order to determine which user it concerns. The trusted center can return to the third party the personal data of said user in case that the user has authorized this transmission and the compensation rules are fulfilled.

Instead of asymmetric keys, the personal keys can be a symmetric secret key.

According to an embodiment of the invention, during the initialization of the personal data with the trusted center, or at a later stage, the user can receive cryptographic material in the form of an electronic certificate or a pair of asymmetric keys. This cryptographic material is stored on the user's device such as laptop, smartphone, tablet. This material is used during the authentication steps carried out by the third party website. After the third party website has initiated the connection with the trusted center, the data exchanged between the user and the trusted center are encrypted using this cryptographic material. As a consequence, the third party website cannot interfere into the authentication procedure and cannot understand the data exchanged.

According to another embodiment, a third party website can send a request for obtaining personal data of users. In this request, this website can define its proposition in term of compensation for accessing the personal data as well as search criteria. The trusted center will then search through its database the find the user's data that match the search criteria. Once a user has been found, the center verifies that the access conditions link to these data allow the transmission of these data. This verification can take into account the general access conditions such as if this category is accessible to third party or if the third party is explicitly allowed to access these data.

In both cases, the user can define financial criteria to have access to his data and the trusted center compares the expectations of the user and the third party proposal. If a match is found, the user's personal data are transferred to the third party is credited by the compensation offered by the third party.

In this particular embodiment of the invention, the system provides a possibility for the user to monetize the communication, under pre-defined conditions, of certain of his personal data to third parties that are ready to compensate him for such communication.

Such pre-defined conditions can include the permission to, or a denial of permission to, re-sell personal data, to third parties subject to afore-mentioned levels of control.

To implement the method of the invention, the trusted center has processing and storage capabilities as well as telecommunication means. The trusted center is preferably connected to Internet so that the users can post their personal data. The processing capabilities are in charge of protecting the personal data, organizing them and carrying out the search requested by the third parties.

The invention claimed is:

1. A method to control the access of personal data of a user by a trusted center comprising:
   loading by a user into a database of the trusted center, user personal data and assigning access conditions to said user personal data, the database comprising, for a specific user, memory locations for personal data, access conditions associated with the personal data and management data comprising at least a counter, said user personal data being divided into at least two categories having two different access conditions, each category being associated with a user's value;
   requesting from the trusted center by a third party access to the personal data of a plurality of users, said request comprising search criteria;
   searching by the trusted center the personal data of the users using the search criteria so as to determine a first set of users matching the search criteria;
   returning to the third party information showing a quantity of the first set of users matching the search criteria, and a sum of the user's values of each user of the first set;
   acknowledging all of part of the sum by the third party, thus defining a second set of users that can comprise all or part of the first set;
   returning personal data of the second set of users for which the sum covers the accumulated values of the extracted users; and
   updating the counter of the second set of users with the content of the value of their respective personal data.

2. The method of claim 1, wherein returning the information showing the quantity of the first set of users matching the search criteria comprises the steps of:
   counting all users of the first of users that have the same user's value; and
   transmitting to the third party, a count of users that have the same user's value.

3. A method to control the access of personal data of a user by a trusted center comprising:
   loading by a user into a database of the trusted center, user personal data and assigning access conditions to said user personal data, the database comprising for a specific user, memory locations for personal data, access conditions associated with the personal data and management data comprising at least a counter, said personal data being divided into at least two categories having two different access conditions, each category being associated with a user's value;
   requesting from the trusted center by a third party access to the personal data of a plurality of users, said request comprising search criteria and a third party value;
   executing by the trusted center the search criteria on the personal data of the users so as to determine a first set of users matching the search criteria for which the user's value is equal or lower than the third party value;
   returning the personal data of the first set of users; and
   updating the counter of the first set of users with the content of the value of their respective personal data.

4. The method of claim 3, wherein the third party transmits a limit value with its request, and wherein a second set of users is selected among the first set of users so that the sum of the user's value of each user of the second set does not exceed the limit value.

5. The method of claim 1, wherein the request by the third party comprises filtering data, the step of returning personal data comprises a step of filtering the personal data according to the filtering data prior to transmitting them to the third party website.

6. The method of claim 1, further comprising the steps of:
   verifying at least some of the personal data; and
   assigning a different user's value if the personal data have been successfully verified.

7. The method of claim 3, wherein the request by the third party comprises filtering data, the step of returning personal data comprises a step of filtering the personal data according to the filtering data prior to transmitting them to the third party website.

8. The method of claim 3, further comprising the steps of:
verifying at least some of the personal data; and
assigning a different user's value if the personal data have been successfully verified.

9. A trusted center comprising:
a database comprising, for each of a plurality of users, memory location for personal data, access conditions associated with the personal data, and management data comprising at least a counter; and
a processor connectable to the database, the processor being adapted to:
load into a database of the trusted center, user personal data and assign access conditions to said user personal data, the database comprising, for a specific user, memory locations for personal data, access conditions associated with the personal data and management data comprising at least a counter, said user personal data being divided into at least two categories having two different access conditions, each category being associated with a user's value;
receive a request from a third party for access to the personal data of a plurality of users, said request comprising search criteria;
search the personal data of the users using the search criteria so as to determine a first set of users matching the search criteria;
return to the third party information showing a quantity of the first set of users matching the search criteria, and a sum of the user's values of each user of the first set;
receive an acknowledgment of all or part of the sum from the third party, thus defining a second set of users that can comprise all or part of the first set;
return personal data of the second set of users for which the sum covers the accumulated values of the extracted users; and
updating the counter of the second set of users with the content of the value of their respective personal data.

* * * * *